United States Patent [19]
Cowan

[11] Patent Number: 5,848,064
[45] Date of Patent: Dec. 8, 1998

[54] WIRELESS SOFTWARE UPGRADES WITH VERSION CONTROL

[75] Inventor: Paul A. Cowan, Hinckley, Ohio

[73] Assignee: Telxon Corporation, Akron, Ohio

[21] Appl. No.: 694,637

[22] Filed: Aug. 7, 1996

[51] Int. Cl.⁶ .................................................. H04L 12/46
[52] U.S. Cl. ............................................ 370/338; 370/401
[58] Field of Search ..................................... 370/310, 328, 370/338, 401–404, 349; 395/200.5, 500, 200.51; 364/222.81, 222.82, 261, 261.2; 379/29, 34

[56] References Cited

U.S. PATENT DOCUMENTS

| | | | |
|---|---|---|---|
| 5,005,122 | 4/1991 | Griffin et al. | 370/401 |
| 5,029,183 | 7/1991 | Tymes | 370/338 |
| 5,155,847 | 10/1992 | Kirouac et al. | 395/200.51 |
| 5,159,592 | 10/1992 | Perkins | 370/401 |
| 5,442,553 | 8/1995 | Parrillo . | |
| 5,504,746 | 4/1996 | Meir | 370/338 |
| 5,504,801 | 4/1996 | Moser et al. | 379/29 |
| 5,570,084 | 10/1996 | Ritter et al. | 370/389 |
| 5,579,509 | 11/1996 | Furtney et al. | 395/500 |
| 5,666,293 | 9/1997 | Metz et al. | 395/200.5 |

*Primary Examiner*—Chau Nguyen
*Attorney, Agent, or Firm*—Renner, Otto, Boisselle & Sklar, P.L.L.

[57] ABSTRACT

A wireless communication system which includes a system backbone; a host computer coupled to the system backbone; at least one base station coupled to the system backbone, the at least one base station including a base station transceiver for communicating wirelessly with mobile devices within the system; at least one mobile device having a mobile device transceiver for communicating wirelessly with the host computer on the system backbone via the at least one base station; and wherein the host computer and the at least one mobile device are operatively configured to communicate selectively mobile device operating software therebetween based on an initial comparison in accordance with a predetermined criteria indicative of whether communication of mobile operating software therebetween is appropriate.

6 Claims, 13 Drawing Sheets

Bootptab Table:

| Mobile Terminal Hardware Address | Internet Protocol (IP) Address | Boot File (Package Name) |
|---|---|---|
| Mobile Terminal 1 | IP1 | Package A |
| Mobile Terminal 2 | IP2 | Package B |
| Mobile Terminal 3 | IP3 | Package C |
| . . . | . . . | . . . |
| Mobile Terminal X | Ipx | Package X |

Fig. 4

Package Definition Files:

Fig. 5a

| Package Name | Version ID, Req. Memory, Mode | File Name | Mobile Ter. Path | Host Path | Type | ROM/RAM |
|---|---|---|---|---|---|---|

Fig. 5b

| Package A | 6.2, 200KB, replace | filename_A1 | mpath A1 | hpath A1 | ... | ROM |
| | | filename_A2 | mpath A2 | hpath A2 | ... | RAM |
| | | . | . | . | . | . |
| | | filename_An | mpath An | hpath An | ... | ROM |

Fig. 5c

| Package B | A3, 150KB, fail safe | filename_B1 | mpath B1 | hpath B1 | ... | RAM |
| | | filename_B2 | mpath B2 | hpath B2 | ... | RAM |
| | | . | . | . | . | . |
| | | filename_Bn | mpath Bn | hpath Bn | ... | ROM |

| Package Z | 1.9, 320KB, replace | filename_Z1 | mpath Z1 | hpath Z1 | ... | ROM |
| | | filename_Z2 | mpath Z2 | hpath Z2 | ... | ROM |
| | | . | . | . | . | . |
| | | filename_Zn | mpath Zn | hpath Zn | ... | RAM |

⋮

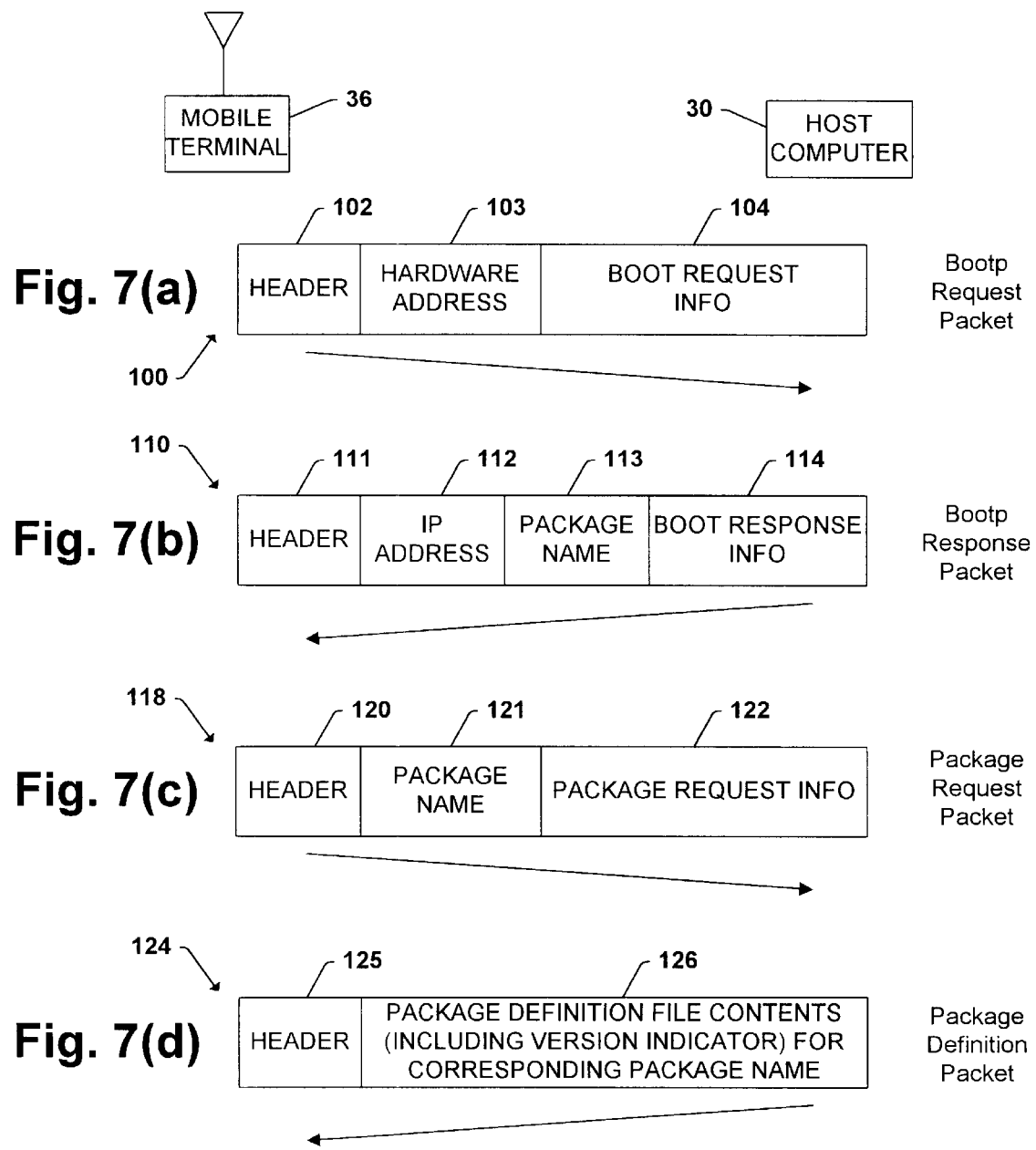

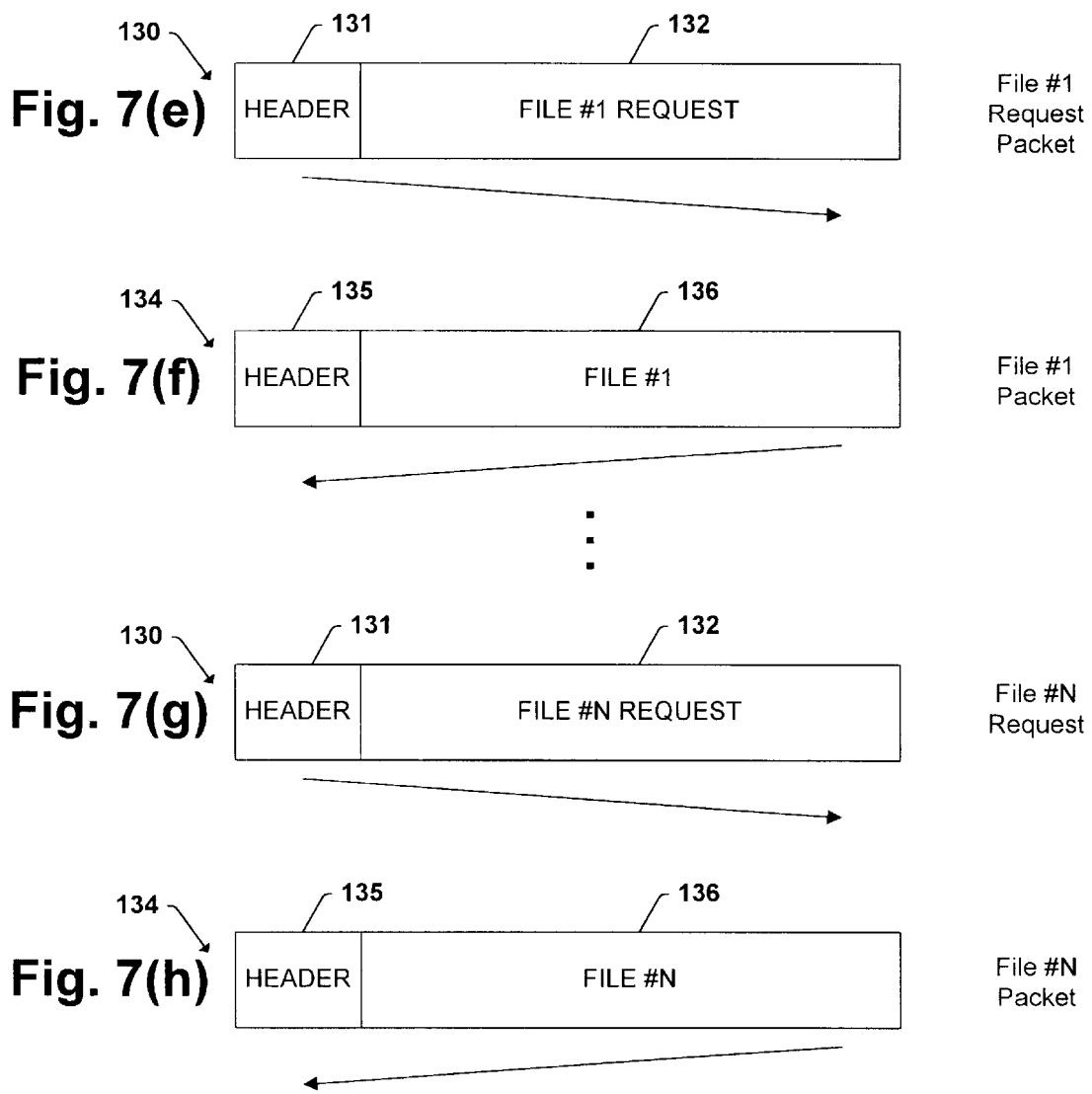

WIRELESS SOFTWARE UPGRADES WITH VERSION CONTROL

TECHNICAL FIELD

The present invention relates generally to wireless software upgrades in wireless communication systems. More particularly, the present invention relates to a system and method in which software upgrades are provided wirelessly to mobile devices upon detecting that software currently in the mobile devices is outdated.

BACKGROUND OF THE INVENTION

In recent years, the use of wireless (e.g., cellular) communication systems having mobile devices which wirelessly communicate with a network, such as a local area network (LAN) and a wide area network (WAN), has become widespread. Retail stores and warehouses, for example, may use cellular communications systems to track inventory and replenish stock. The transportation industry may use such systems at large outdoor storage facilities to keep an accurate account of incoming and outgoing shipments. In manufacturing facilities, such systems are useful for tracking parts, completed products, defects, etc.

A typical cellular communication system includes a number of fixed base stations or access points interconnected by a cable medium often referred to as a system backbone. Also included in many cellular communication systems are intermediate base stations which are not directly connected to the system backbone. Intermediate base stations, often referred to as wireless base stations or repeaters, increase the area within which base stations connected to the system backbone can communicate with mobile devices. Unless otherwise indicated, the term "base station" will hereinafter refer to both base stations hardwired to the network and wireless base stations.

Associated with each base station is a geographic cell. A cell is a geographic area in which a base station has sufficient signal strength to transmit data to and receive data from a mobile device with an acceptable error rate. Typically, base stations will be positioned along the backbone such that the combined cell area coverage from each base station provides full coverage of a building or site. Thus, mobile devices roaming within such an area can maintain continuous communication with a host computer or other device situated along the system backbone.

Each mobile device roaming within a building or site is typically preloaded with software to provide both application level and operational level instructional code (referred to generally herein as "operating software"). The mobile device includes one or more processors which execute the operating software, thereby allowing the mobile device to carry out its appropriate functions. The software is stored in memory in the mobile device and may be executed at any time depending on the particular operational needs of the mobile device.

Due to changing market needs and advancements in technology, for example, it often happens that the software which is preloaded into a mobile device becomes outdated prior to the time the mobile hardware device becomes obsolete. Therefore, a number of methods for upgrading the operating software stored in a mobile device have been developed.

One known method for updating software in a mobile device is by physically connecting the mobile device to a computer capable of upgrading the software. In order to upgrade software using this technique it is typically necessary to employ one or more service technicians to assist in connecting the mobile device to the computer with a cable or the like and executing the software upgrade routine. This results in down time for the mobile device and related service costs.

Another known method of updating the operating software in a mobile device involves wirelessly transmitting software upgrades to the mobile device. When executing a wireless software upgrade, a mobile device transmits a request to the host computer (via a base station) requesting that the host computer transfer the upgraded software. In order to ensure a mobile device has the most recent version of the operating software, each program within the operating software must be downloaded periodically from the host computer and stored in the mobile device. Unfortunately, the periodic transfer of upgraded operating software to the mobile device can be extremely time consuming and becomes increasingly more time consuming as the number of mobile devices within the system increases. Furthermore, since there is no way to determine if software has been changed since the previous time the mobile device software has been upgraded, time is frequently wasted updating the mobile device operating software with the same version of software which already exists in the mobile device.

In view of the aforementioned shortcomings associated with existing systems and techniques for upgrading mobile device operating software, there is a strong need in the art for a system and method which does not require significant down time or service costs. Moreover, there is a strong need in the art for a system and method which avoids the inefficiencies associated with conventional wireless techniques for upgrading the mobile device operating software.

SUMMARY OF THE INVENTION

A wireless communication system and method is provided in which software upgrades are wirelessly transmitted to a mobile device based on a determination of whether such an upgrade is necessary. According to a preferred embodiment, during an initial boot-up procedure each mobile device queries or otherwise prompts a host computer connected to the system backbone to identify a version of operating software which is stored in the host computer. The mobile device compares the version indicia provided from the host computer with information identifying the version of operating software the mobile device presently has stored within. If the mobile device does not currently have the operating software version identified by the host computer, the mobile device prompts the host computer to download the version stored in the host computer. Otherwise, the mobile device simply continues to operate using the operating software currently stored therein. In this manner, the system does not needlessly spend time replacing the operating software in the mobile devices with the same software.

Furthermore, the system and method of the present invention also allows a user to select one or more different packages of operating software which may be available from the host computer. A user may simply select a package of operating software from a menu provided by the mobile device, and in response the mobile device prompts the host computer to download the selected package to the mobile device. According to another feature of the invention, a WAN includes a plurality of communication systems tied together by a WAN based system backbone. A WAN based host computer provides updated mobile terminal operating software to the host computers in the individual systems.

The mobile device operating software can then be distributed quickly to the various mobile devices.

In accordance with one particular aspect of the invention, a wireless communication system is provided which includes a system backbone; a host computer coupled to the system backbone; at least one base station coupled to the system backbone, the at least one base station including a base station transceiver for communicating wirelessly with mobile devices within the system; at least one mobile device having a mobile device transceiver for communicating wirelessly with the host computer on the system backbone via the at least one base station; and wherein the host computer and the at least one mobile device are operatively configured to communicate selectively mobile device operating software therebetween based on an initial comparison in accordance with a predetermined criteria indicative of whether communication of mobile-operating software therebetween is appropriate.

In accordance with another aspect of the invention, a wireless communication system is provided which includes a system backbone; a host computer coupled to the system backbone, the host computer having a host computer memory with mobile device operating software stored therein; at least one base station coupled to the system backbone and including a base station transceiver for conducting wireless communications, the at least one base station enabling communications between the host computer and mobile devices within the system by serving as an interface between wireless communications involving the mobile devices and hardwired communications involving the host computer via the system backbone; and at least one mobile device for conducting communications with the host computer by way of the at least one base station and the respective base station transceiver, the at least one mobile device including: a mobile device transceiver for communicating wirelessly with the base station transceiver; a programmable control circuit controlling the operation of the mobile device; a mobile device memory for storing mobile device operating software executed by the programmable control circuit; and wherein the programmable control circuit is operatively coupled to the mobile device transceiver to send at least one communication to the host computer which prompts the host computer to communicate to the mobile device indicia representing a version of mobile device operating software stored in the host computer memory, whereby the programmable control circuit compares the indicia to a version of mobile device operating software currently stored in the mobile device memory, and based on the comparison the mobile device selectively sends at least one other communication to the host computer which prompts the host computer to communicate to the mobile device at least a portion of the mobile device operating software stored in the host computer memory.

According to yet another aspect of the invention, a wireless communication system is provided which includes a system backbone; a host computer coupled to the system backbone; at least one base station coupled to the system backbone, the at least one base station including a base station transceiver for communicating wirelessly with mobile devices within the system; at least one mobile device having a mobile device transceiver for communicating wirelessly with the host computer on the system backbone via the at least one base station, and a user input for receiving a user selection; and wherein the host computer and the at least one mobile device are operatively configured to communicate selectively mobile device operating software therebetween based on the user selection.

In accordance with still another aspect of the invention, a method of operation is provided for a wireless communication system comprising a system backbone; a host computer coupled to the system backbone; at least one base station coupled to the system backbone, the at least one base station including a base station transceiver for communicating wirelessly with mobile devices within the system; and at least one mobile device having a mobile device transceiver for communicating wirelessly with the host computer on the system backbone via the at least one base station. The method includes the step of the host computer and the at least one mobile device communicating selectively mobile device operating software therebetween based on an initial comparison in accordance with a predetermined criteria indicative of whether communication of mobile operating software therebetween is appropriate.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 4 illustrates the contents of a bootptab table stored in memory within the host computer, the bootptab table including the internet protocol (IP) addresses and boot file package names associated with each mobile terminal in the system in accordance with the present invention;

FIG. 5a illustrates the general format of the package definition files stored in memory within the host computer, wherein each package definition file includes information identifying operating software to be used by mobile terminals within the system and information indicating the version of the operating software in accordance with the present invention;

FIGS. 5b, 5c and 5d represent exemplary package definition files in accordance with the present invention;

FIGS. 7(a)–7(h) represent schematically a process in which information packets are exchanged between a mobile terminal and the host computer (via a base station) in order to identify and transfer upgraded operating software in accordance with an exemplary embodiment of the present invention;

DESCRIPTION OF THE PREFERRED EMBODIMENTS

Figure 1:
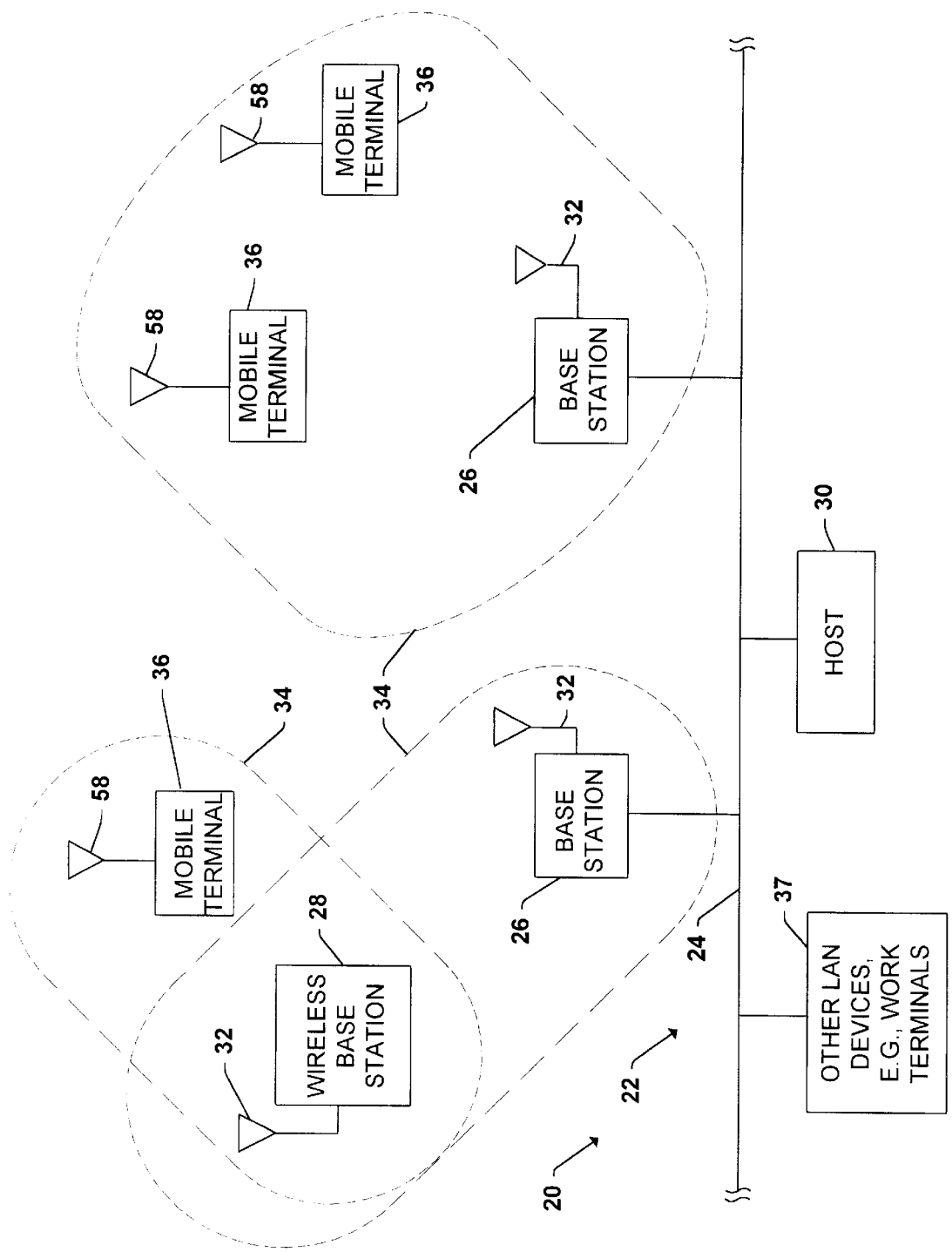
FIG. 1 is a block diagram of a wireless communication system in accordance with an exemplary embodiment of the present invention.

The present invention will now be described with reference to the drawings wherein like reference numerals are used to refer to like elements throughout.

As is mentioned above, the present invention relates to wireless (e.g., cellular) communication systems which include mobile devices that can roam from cell to cell. Such mobile devices can be data terminals, telephones, pagers, etc. In the exemplary embodiment described hereinafter, each mobile device is a mobile data terminal (hereinafter "mobile terminal") used to communicate data such as inventory or the like within a cellular system. However, it is recognized that the invention contemplates other types of mobile devices and is not intended to be limited to systems utilizing mobile terminals.

Referring now to FIG. 1, a cellular communication system 20 is shown in accordance with the exemplary embodiment of the present invention. The cellular communication system 20 includes a network 22 having a system backbone 24. The system backbone 24 may be a hardwired data communication path made of twisted pair cable, shielded coaxial cable or fiber optic cable, for example, or may be wireless in nature. Connected to the system backbone 24 are several base stations 26. Each base station 26 serves as an entrance point through which wireless communications may occur with the system backbone 24. Additionally, in order to expand the effective communication range of the base stations 26, one or more wireless base stations 28 are also included in the cellular communication system 20. As is conventional, each wireless base station 28 associates itself, typically by registration, with another base station, whether hardwired or wireless, such that a link is formed between itself and other devices situated on the system backbone 24. For example, in the system 20 shown in FIG. 1 a wireless base station 28 associates itself with one of the base stations 26 connected to the system backbone 24 so that a communication link is formed between the wireless base station 28 and a host computer 30 also coupled to the system backbone 24. All communications between the wireless base station 28 and a device on the system backbone 24 are made possible by the other base stations on the link which are configured to relay communications therebetween.

Each base station 26, 28 is capable of wirelessly communicating with other devices in the system 20 via an antenna 32. A geographic cell 34 associated with each base station 26, 28 defines a region of coverage in which successful wireless communication may occur. Depending on the type of antenna 32 selected and the output power of the respective base station, the cell 34 may take one of several different forms and sizes. For example, FIG. 1 depicts the base stations 26, 28 utilizing an omni-directional antenna wherein a generally spherical cell area of coverage is obtained. However, a directed yagi-type antenna or other form of antenna could also be used as will be readily appreciated.

The cellular communication system 20 also includes one or more mobile terminals 36. Each mobile terminal 36 communicates with devices on the system backbone 24 via a selected base station 26, 28 and/or with other mobile terminals 36. Upon roaming from one cell 34 to another, the mobile terminal 36 is configured to associate itself with a new base station 26, 28 according to conventional techniques. Furthermore, the cellular communication system 20 may include one or more other devices 37 connected to the system backbone 24. Such devices 37 may include work terminals, printers, cash registers, etc.

In the exemplary embodiment, the host computer 30 is responsible for supporting the network activities of the mobile terminals 36 within the system 20. As part of such function, the host computer 30 is responsible for maintaining the current versions of operating software for each of the mobile terminals 36. When a mobile terminal 36 within the system initially powers up (via an on/off switch for example) or is reset, the mobile terminal 36 goes through an initialization, or boot-up routine. Such routine includes communicating with the host computer 30 via a selected base station 26 in order that the host computer 30 provides the mobile terminal 36 with its internet protocol (IP) address as is conventional. In addition, however, a comparison is made during such boot-up routine whereby the mobile terminal 36 compares the version of operating software it currently has stored within its memory with the version of operating software stored in the host computer 30. If the mobile terminal 36 has a different version of operating software stored within as compared to the version currently stored in the host computer 30, it is assumed that the operating software in the host computer 30 has been upgraded. Consequently, the mobile terminal 36 issues a request to the host computer 30 to transmit to the mobile terminal 36 the upgraded version of the operating software as is described more fully below. In the event the version of the operating software stored in the host computer 30 is the same version as that which is currently stored in the mobile terminal 36, the mobile terminal 36 does not prompt the host computer 30 to retransmit the operating software. Rather, the mobile terminal 36 simply completes the remainder of its boot-up routine. In this manner, needless downloading of files is avoided.

Accordingly, when a system operator wishes to change the operating software of one or more mobile terminals 36 within the system 20, the system operator simply loads the upgraded software into the host computer 30 as discussed below in relation to FIGS. 8 and 9. Included with each version of operating software is a unique identifier indicative of the particular version. Then, when a mobile terminal 36 is next rebooted, the mobile terminal 36 will detect that the host computer 30 has an upgraded version of operating software and will proceed to request that the upgraded software be downloaded.

Figure 2:
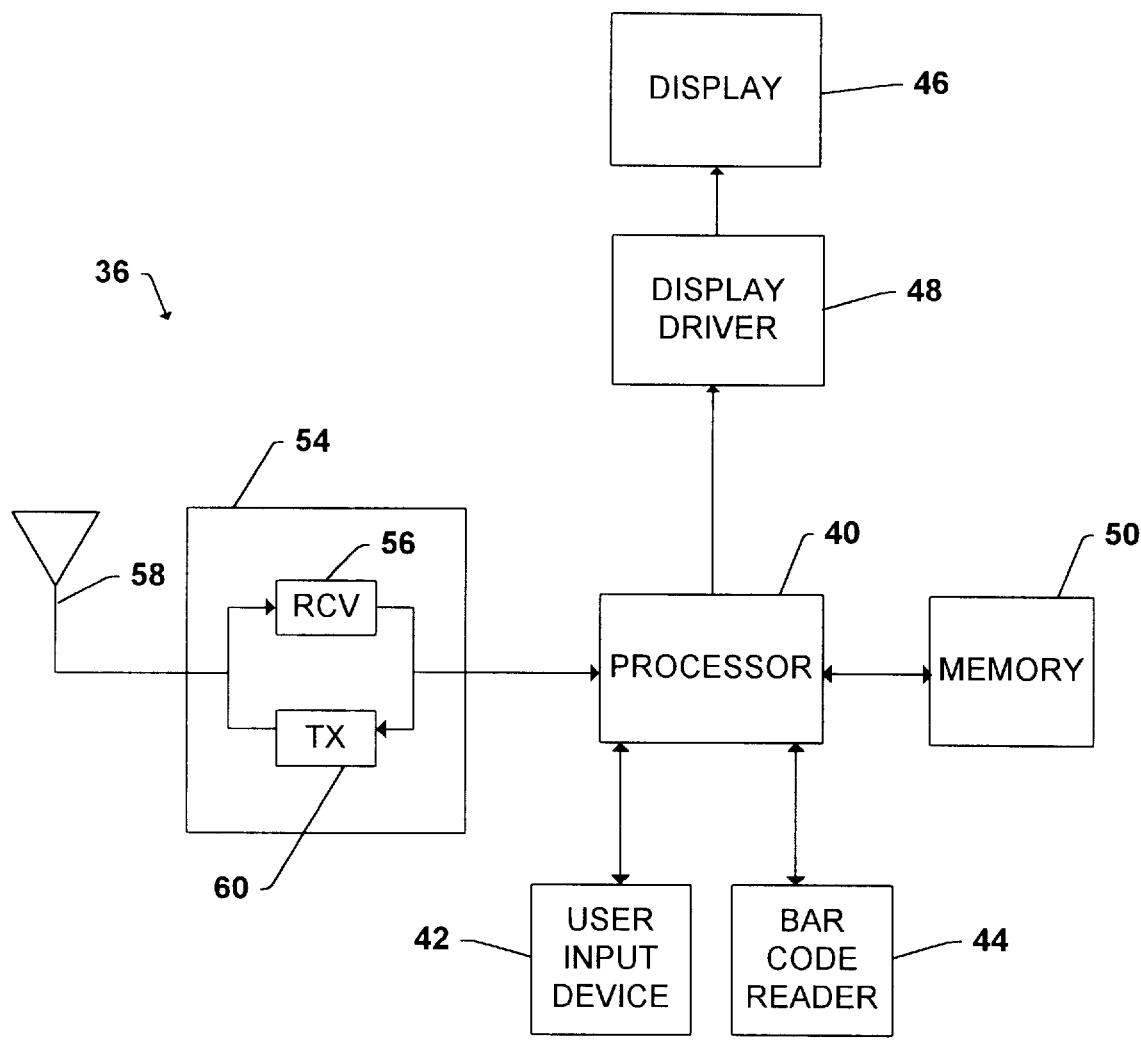
FIG. 2 is a block diagram of a mobile terminal in accordance with the present invention.

FIG. 2 is a block diagram representing the basic structure of each of the mobile terminals according to the exemplary embodiment. Each mobile terminal 36 includes a processor 40 which can be programmed to control and to operate the various components within the mobile terminal 36 in order to carry out the various functions described herein. The processor 40 may be, for example, an Intel 80486 or similar type microprocessor. The processor 40 is coupled to a user input device 42 which allows a user to input data to be communicated to the system backbone 24 such as inventory data, patient information, etc. This information may be sent to the host computer 30 which serves as a central data location, for example, or to a cash register connected to the system backbone 24, as another example, for providing price information. Furthermore, the input device 42 allows a user to input a software availability request as is discussed in more detail below. The input device 42 can include such items as a keypad, touch sensitive display, etc. The mobile terminal 36 also may include a bar code reader 44 coupled to the processor 40 for providing another form of data input. A display 46 is also connected to and controlled by the processor 40 via a display driver circuit 48. The display 46 serves as a means for displaying information stored within the mobile terminal 36 and/or received over the system backbone 24 via a base station 26. The display 46 can be a flat panel liquid crystal display with alphanumeric capabilities, for example, or any other type of display as will be appreciated.

Each mobile terminal 36 also includes a memory 50 for storing program code executed by the processor 40 for carrying out the functions described herein. In particular, the memory 50 includes a non-volatile portion (e.g., an EEPROM) for storing mobile terminal operating software which is executed by the processor 40 in order to carry out the desired operations of the mobile terminal 36. The particular operating software is not critical to the invention and it will suffice to say that such operating software typically will be related to the application of the mobile terminal, e.g., communication protocols, utility programs such as for inventory control, patient care, etc. As noted above, however, it may be desirable at times to upgrade such operating software with revised and/or completely different software. Thus, the memory 50 also has stored therein code which is executed by the processor 40 in order to perform the functions described below in relation to FIGS. 7(*a*)–7(*h*) and FIG. 8 for downloading upgraded software from the host computer 30. The actual code for performing such functions can be easily programmed by a person having ordinary skill in the art of computer programming in any of a number of conventional programming languages based on the disclosure herein. Consequently, further detail as to the particular code itself has been omitted for sake of brevity.

As is described below in more detail in connection with FIGS. 7(*a*)–7(*h*) and FIG. 8, the processor 40 also stores in the memory 50 information relating to the version of mobile terminal operating software stored therein. The processor 40 compares this information with information received from the host computer 30 relating to the version of operating software for the mobile terminal 36 which is stored in the host computer 30. If the host computer 30 has a different version of the operating software, the processor 40 proceeds to request that the host computer 30 download the new version and the processor 40 goes on to replace the previous operating software which was stored in the memory 50 with the upgraded operating software obtained from the host computer 30.

Each mobile terminal 36 also includes its own RF transceiver section 54 connected to the processor 40. The RF transceiver section 54 includes an RF receiver 56 which receives RF transmissions from a base station 26, 28 via an antenna 58 and demodulates the signal to obtain the digital information modulated therein. An example of a suitable RF receiver 56 for use in the mobile terminal 36 (as well as the base stations 26, 28) is the Model 025 Direct Sequence Spread Spectrum Radio Module, which is commercially available from Aironet Wireless Communications, Inc. of Akron, Ohio.

The RF transceiver section 54 also includes an RF transmitter 60. In the event the mobile terminal 36 is to transmit information to the backbone 24 in response to an operator input at input device 42 or as part of its boot-up routine, for example, the processor 40 forms digital information packets which are then delivered to the RF transmitter 60. According to conventional techniques, the RF transmitter 60 transmits an RF signal with the information packets modulated thereon via the antenna 58 to the base station 26 with which the mobile terminal 26 is registered.

Figure 3:
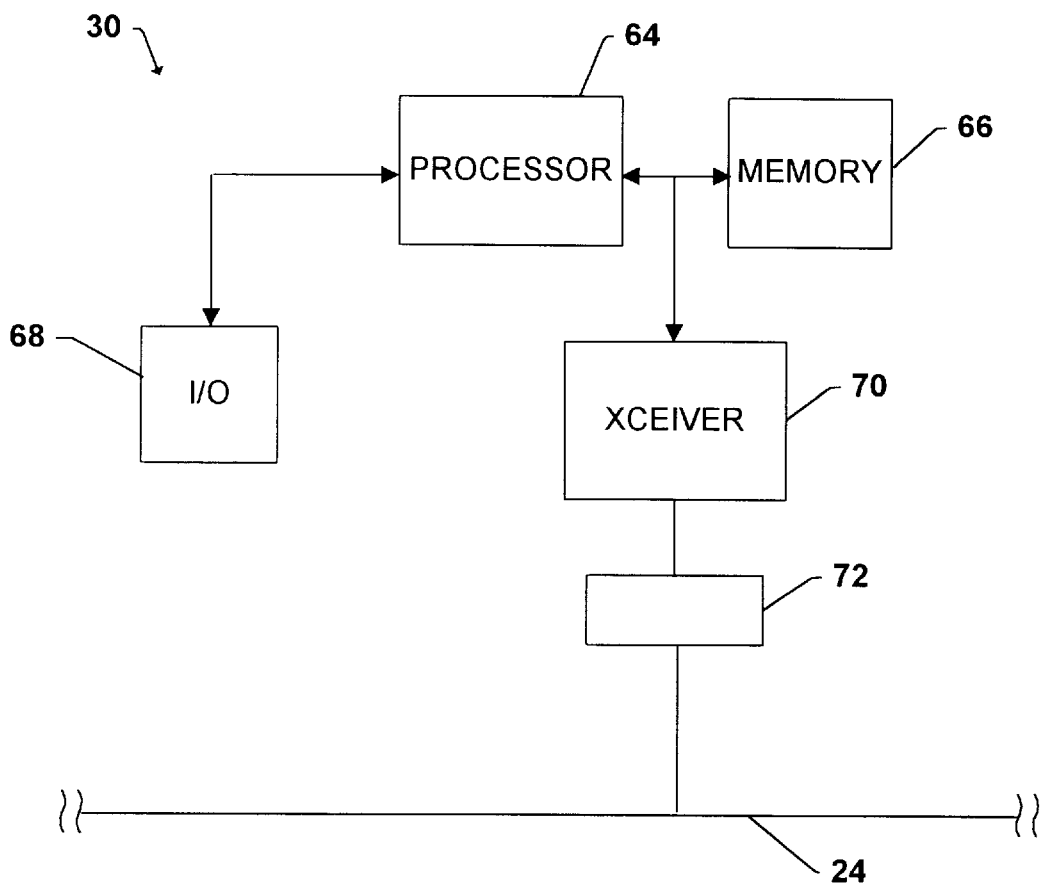
FIG. 3 is a block diagram of a host computer in accordance with the present invention.

Referring now to FIG. 3, a block diagram of the host computer 30 is provided. The host computer 30 may be a personal computer, for example, and includes its own processor 64 (e.g., an Intel 80486DX or Pentium® processor). Coupled to the processor 64 is a memory 66 for storing code for controlling the operation of the host computer 30 in accordance with the description provided herein. Again, based on the description provided herein, a person having ordinary skill in the art of computer networks and system administration will be able to set up the host computer 30 to support the various operations described herein. Accordingly, additional detail is omitted. The memory 66 may include, but certainly is not limited to, a hard disk storage medium.

The memory 66 also has stored therein the aforementioned current versions of the mobile terminal operating software for the various mobile terminals 36 included in the system 20. Specifically, there is stored in the memory 66 a bootptab table as shown in FIG. 4. Briefly, the bootptab table is maintained by the processor 64 and is arranged to include an entry for each mobile terminal within the system 20. As shown in FIG. 4, each entry includes the hardware address of the mobile terminal and the corresponding internet protocol (IP) address assigned to the mobile terminal. In addition, each entry includes a boot file in the form of a package name which identifies the particular package of operating software which is to be utilized by the corresponding mobile terminal 36.

Also stored in the memory 66 is a collection of package definition files as represented in FIGS. 5*a*–5*d*. Specifically, the memory 66 includes a different package definition file for each particular package name included in the bootptab table shown in FIG. 4. FIG. 5*a* illustrates generally the various information fields included in each package definition file, whereas FIGS. 5*b*–5*d* provide illustrative examples of different package definition files. Each package definition file includes a version identifier (e.g., 6.2, A3, 1.9, etc.) which is a unique identifier of the particular version of the operating software associated with that particular package name. Each time one or more software files included in the operating software associated with a given package name is added, deleted or modified, the version identifier stored in the package definition file for that package name is modified by the system administrator to a new, unique identifier.

Each package definition file also includes an indication of the total memory occupied by the operating software associated with the package name (e.g., 200 Kbytes, 150 Kbytes, etc.). In addition, each package definition file includes an indicator which indicates whether the operating software which is downloaded from the host computer 30 to the mobile terminal is to be downloaded in a "replace" or "fail safe" mode as is discussed in more detail below. Each package definition file also includes a list of filenames included in the operating software associated with the package name. As will be appreciated, such file names represent the files that are utilized by the mobile terminal 36 to carry out its various operations. The actual contents of such files are conventional and are not germane to the invention. If, however, any of these files are deleted, added, or modified as described above, the version indicator is updated in the package definition file by the system administrator.

Furthermore, each package definition file includes the mobile terminal path (e.g., the directory path) identifying where in the mobile terminal memory 50 the respective files represented by the file names are to be stored. Each package definition file also includes the host computer path (e.g., the directory path) indicating where in the host computer memory 66 the respective files are stored. The package definition files also include information relating to the file type for each of the file names identified in the package definition, such type information being useful for facilitating downloading of the file as is conventional. For example, the type information may indicate that the file is currently stored in a compressed mode and needs to be decompressed upon receipt, etc. Finally, the package definition files include information relating to whether each of the files represented by the file names is to be stored in read only memory (ROM) or random access memory (RAM) in the mobile terminal 36.

Furthermore, the memory 66 has stored therein the actual files identified in each package name entry included in the Package Definition Table.

Each time a system administrator updates any portion of the operating software stored in the memory 66, the system administrator also is responsible for assigning a new version identifier in the corresponding package definition file. For example, file names may be added or deleted from a package. Alternatively, one or more files may be modified. In either case, the operating software represents a new version.

The processor 64 is coupled to an input/output (I/O) port or device 68 as shown in FIG. 3. The I/O device 68 may include a floppy disk drive or the like which enables a system operator to transfer upgraded mobile terminal operating software into the memory 66 using conventional file transfer techniques. The processor 64 is coupled to the system backbone 24 by way of a network adaptor transceiver 70 and connector 72 as is conventional. The host computer 30 is able to transmit and receive information over the system backbone 24 via the transceiver 70 and connector 72.

Figure 6:
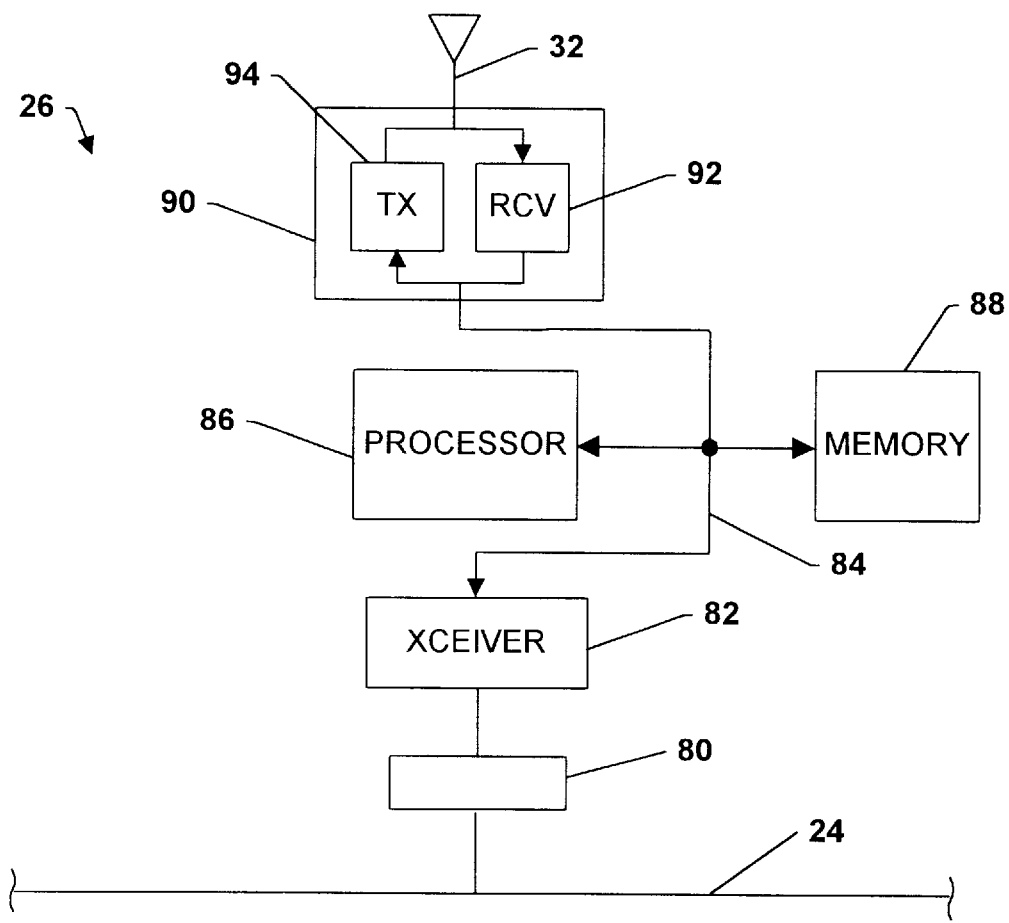
FIG. 6 is a block diagram of a base station in accordance with the present invention.

Referring now to FIG. 6, a block diagram representative of each base station 26 is shown. Each base station 26 is connected to the system backbone 24 via a connector 80 such as a DB-9 or RJ-45 connector. The connector 80 is connected to the system backbone 24 at one end and to a network adapter transceiver 82 included in the base station 26 at the other end. The network adapter transceiver 82 is configured according to conventional network adapter transceiver techniques to allow the base station 26 to communicate over the system backbone 24. The network adapter transceiver 82 is also connected to an internal bus 84 included within the base station 26. The base station 26 further includes a processor 86 connected to the bus 84 for controlling and carrying out the operations of the base station 26. The processor 86 may include any of a variety of different microprocessors, such as the Motorola 68360 (25 MHz) or Intel 80386 microprocessors, for example.

The base station 26 also includes a memory 88 connected to the bus 84. The memory 88 stores program code executed by the processor 86 to control the other elements within the base station 26 to carry out the functions referred to herein. The memory 88 also serves to buffer information such as information received over the system backbone 24 or those transmitted to or received from the mobile terminals 36. Also connected to the bus 24 is an RF transceiver section 90 included in the base station 26. The RF transceiver section 90 includes the aforementioned antenna 32 for receiving radio signals from and transmitting radio signals to mobile terminals 36 within the cell area 34 of the base station 26.

Information transmitted from a mobile terminal 36 to the base station 26 is received via the antenna 32 and is processed by an RF receiver 92 which demodulates and decodes the signal and converts the information to a digital signal. The processor 86 in the base station 26 then processes the information according to conventional techniques and stores the information in the memory 88 until such time as the base station 26 is able to transmit the information to its intended destination on the system backbone 24 (e.g., the host computer 30) via the network adapter transceiver 82 and connector 80.

Information which is transmitted to the base station 26 via the system backbone 24 (e.g., from the host computer 30) for transmission to a mobile terminal 36 is received by the network transceiver 82. The processor 86 controls an RF transmitter 94 included in the RF transceiver section 90, the RF transmitter 94 also being connected to the bus 84. The processor 86 causes the RF transmitter 94 to modulate an RF signal using spread spectrum techniques, for example, which in turn carries the information to the appropriate mobile terminal 36. Exemplary hardware for carrying out the above-described basic functions of transmitting and receiving data between the system backbone 24 and one or more mobile terminals 36 is found in the ARLAN 631® Token Ring Access Point, which is commercially available from Aironet Wireless Communications, Inc., Akron, Ohio.

FIGS. 7(*a*) through 7(*h*) schematically represent the exchange of information between a mobile terminal 36 and the host computer 30 in accordance with the exemplary embodiment of the invention. It will be appreciated that, with respect to communications between the mobile terminal 36 and the host computer 30, the base station 26 to which the mobile terminal 36 is registered serves as an interface between the mobile terminal 36 and the host computer 30 as is well known in the art. As represented in FIG. 7(*a*), when the mobile terminal 36 undergoes its boot-up initialization routine the mobile terminal 36 transmits a Bootp Request packet 100 to the host computer 30. The Bootp Request packet 100 is a packet which includes a header field 102 (e.g., synchronization bits, etc., as is conventional), a hardware address field 103 which holds the hardware address of the mobile terminal 36, and a boot request field 104 which contains information requesting that the host computer 30 furnish information relating to the boot-up procedures of the mobile terminal 36. The Bootp Request packet 100 is generated by the processor 40 within the mobile terminal 36.

As is represented in FIG. 7(*b*), the host computer 30 receives the Bootp Request packet 100 and, in response, the processor 64 generates and transmits a Bootp Response packet 110 back to the mobile terminal 36. The Bootp Response packet 110 includes a header 111; an IP address field 112 containing the IP address of the mobile terminal 36; a package name field 113 containing the name of the package of operating software associated with the mobile terminal 36; and a boot response information field 114 containing other conventional information which may be associated with the boot-up procedures of the mobile terminal 36.

More specifically, when the host computer 30 receives the Bootp Request packet 100 from the mobile terminal 36, the processor 64 performs a look-up in the bootptab table stored in the memory 66 based on the hardware address contained in the hardware address field 103. Specifically, the processor 64 looks up the entry in the bootptab table having the same hardware address. The processor 64 then takes the corresponding IP address and package name from the bootptab table and includes them in the IP address field 112 and package name field 113, respectively, of the Bootp Response packet 110 which is transmitted to the mobile terminal 36.

Upon receiving the Bootp Response Packet 110, the mobile terminal 36 as represented in FIG. 7(c) transmits a Package Request Packet 118 to the host computer 30. The Package Request Packet 118 includes a header field 120; a package name field 121; and a package request information field 122 for any other conventional information which is utilized in a given system. Notably, the package name field 121 includes the package name previously received in the Bootp Response Packet 110 as represented in FIG. 7(b). The mobile terminal processor 40 temporarily stores the package name received in field 113 and generates the Package Request Packet 118 with the package name included in field 121. The purpose of the Package Request Packet 118 is to prompt the host computer 30 to transmit back to the mobile terminal 36 a Package Definition Packet which includes the contents of the package definition file (FIG. 5a–5d) for the particular package name. More particularly, upon receiving the Package Request Packet 118 the host computer processor 64 takes the package name included in the package name field 121 and uses the package name to access the corresponding package definition file stored in the memory 66.

Specifically, the processor 64 forms a Package Definition Packet 124 as represented in FIG. 7(d). The packet 124 includes a header 125 and a package definition field 126. The packet definition field 126 includes all of the information in the package definition file for the particular package name identified in the field 121. In particular, the package definition field 126 includes the version identifier and the list of file names together with the previously described information relating to the required memory, file transfer mode, memory paths, file types, etc. The host computer 30 then transmits the Package Definition Packet 124 to the mobile terminal 36 as represented in FIG. 7(d).

Upon receiving the Package Definition Packet 124, the mobile terminal processor 40 initially compares the version identifier included in the package definition field 126 with the version identifier previously stored by the processor 40 the last time the mobile terminal downloaded files from the host computer 30. If the versions are identical, then the mobile terminal 36 concludes that no upgrades or revisions have been performed to the files included in the respective package. If the versions are different, then the mobile terminal 36 stores the information from the Package Definition Packet 124 and then begins the process of sequentially stepping through each file name listed in the package definition file in the package definition field 126 and transmitting a request that the host computer 30 transfer the actual file so that it may be downloaded and stored in the mobile terminal 36. For example, FIG. 7(e) illustrates a file request packet 130 which is generated by the mobile terminal processor 40 and which includes a header 131 and a file request field 132. The file request field 132 includes the name of the next file which the mobile terminal 36 requests to be downloaded from the host computer 30 to the mobile terminal 36. Depending on the particular file transfer protocol utilized within the system, the file request field 132 may also have such information as the location at which the particular file is stored in the host computer 30, etc., as obtained from the package definition table 126. However, it will be appreciated that the actual file transfer protocol utilized in accordance with the present invention can be any well known transfer protocol and is not limited to any particular one.

The mobile terminal 36 transmits the file request packet 130 to the host computer 30 as represented in FIG. 7(e), and in response the host computer 30 forms a file packet 134 which is transmitted back to the mobile terminal 36. The file packet 134 includes a header 135 and a file field 136. The file field 136 includes the contents of the file named in the file request field 132. Consequently, the file is downloaded to the mobile terminal 36 where it is stored for use in the operations of the mobile terminal. Next, the mobile terminal 36 generates and transmits another file request packet 130 requesting that the next file included in the list of file names in the package definition field 126 be downloaded to the mobile terminal 36. Similarly, the host computer 30 responds by transmitting another file packet 134 including the contents of the file named in the file request field 132. Such sequential exchange of file requests and the transfer of files between the mobile terminal 36 and the host computer 30 continues as represented in FIGS. 7(g)–7(h) until the mobile terminal has requested and received each of the files named in the package definition file received in the package definition field 126.

Accordingly, it will be appreciated that files from the host computer 30 will not be downloaded to a mobile terminal 36 until and unless it has been determined that a new version of mobile terminal operating software exists in the host computer 30. In the event it is determined that a new version exists, every file identified in the package definition file for the corresponding package name is downloaded regardless of whether only one file or more than one file has been changed, added and/or deleted in the package.

As previously mentioned, each package definition file includes the amount of memory which the mobile terminal will need in order to download all of the files listed in the package definition file and the mode of replacing the information in the mobile terminal. More particularly, there are two exemplary modes in which the mobile terminal 36 may download the new version of the mobile terminal operating software to replace an old version. One method is known as the replace mode, and the second method is known as the fail safe mode. If the information in the package definition file indicates that the mobile terminal 36 should be operating in the replace mode, then anytime there is a new version of operating software to be downloaded the mobile terminal 36 is programmed to discard immediately the old version of each file prior to downloading the package of new files. The disadvantage of the replace mode is that it is possible that the mobile terminal 36 will fail such as, for example, run out of memory space, experience an RF link failure or host computer failure, etc., prior to receiving all of the files of the new version. In this case, the mobile terminal will not have a complete copy of either the old or new versions. In the fail safe mode, however, all files in the old version remain saved in the mobile terminal memory until all files belonging to the new version have been downloaded successfully. Only after all of the files belonging to the new version have been received does the mobile terminal 36 discard the old version of the files. Thus, the mobile terminal 36 has the ability to operate using the old version in the event of a problem in downloading the new version. The disadvantage is that the fail safe mode requires more memory in the mobile terminal 36 as compared to the replace mode.

Figure 8A:
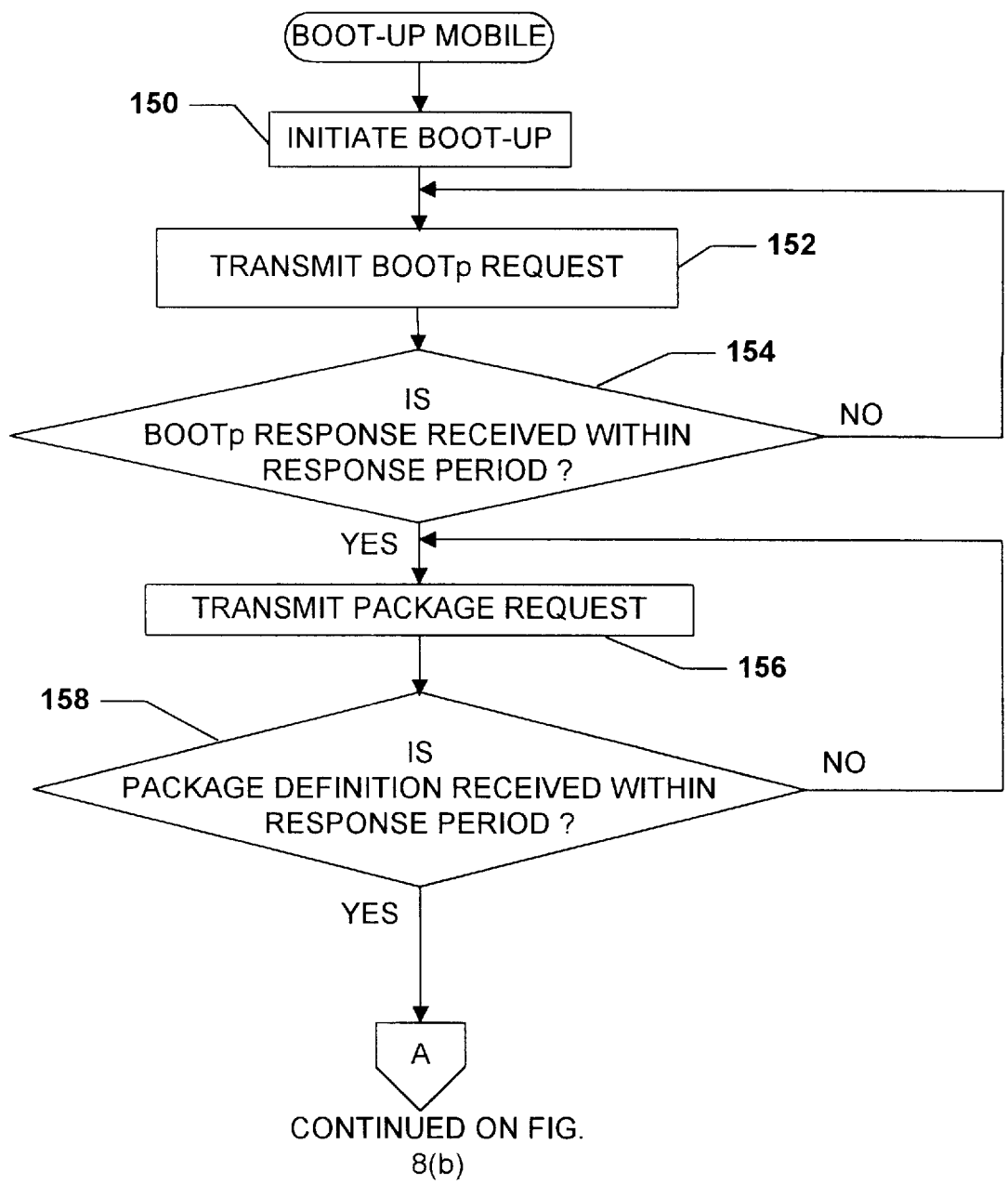
FIG. 8(a)–8(b) is a system flowchart suitable for programming a mobile terminal to request and download upgraded operating software from the host computer in accordance with the present invention.
Figure 8B:
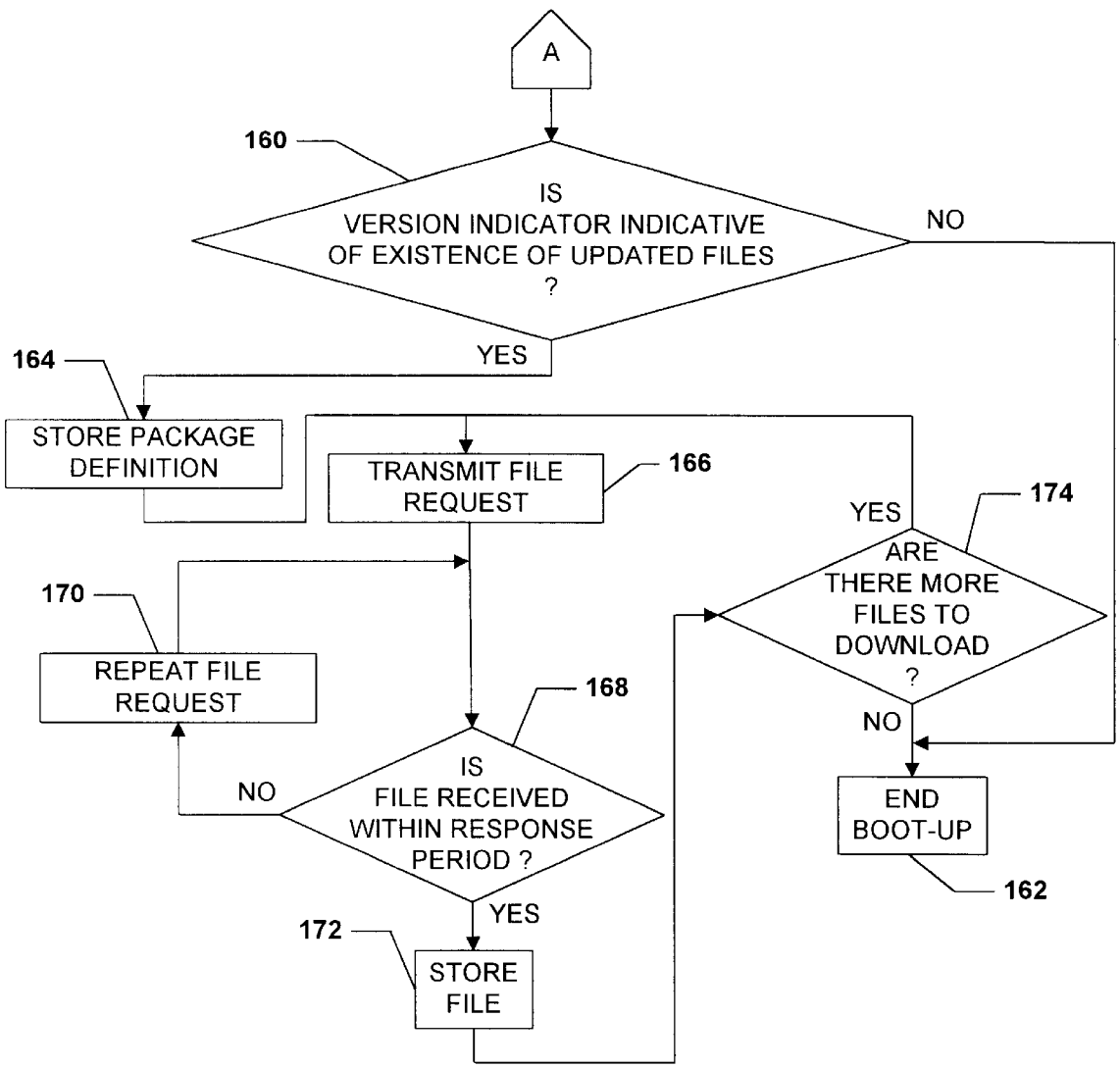

FIG. 8(a)–8(b) illustrates the basic operation of the mobile terminal 36 in accordance with the procedures described above. Beginning in step 150, the processor 40 within the mobile terminal 36 initiates its own internal boot-up routine upon being powered up and/or reset as is conventional. Next, in step 152 the processor 40 generates and transmits a Bootp Request Packet 100 to the host computer 30 as represented in FIG. 7(a). Following step 152, the processor 40 determines in step 154 whether a Bootp Response Packet 110 is received back from the host computer 30 within a predetermined response period (e.g., five seconds). If not, the processor 40 returns to step 152 and retransmits the Bootp Request Packet 100. If the Bootp Response packet 110 is received by the processor 40 in step 154 as illustrated in FIG. 7(*b*), the processor 40 proceeds to step 156 in which it transmits the Package Request Packet 118 to the host computer 30 as represented in FIG. 7(*c*). Following step 156, the processor determines in step 158 whether a Package Definition Packet 124 has been received from the host computer 30 in response to the Package Request Packet 118 within a predetermined response period (e.g., five seconds). If not, the processor 40 returns to step 156 and retransmits the Package Request Packet 118.

Upon determining that a Package Definition Packet 124 has been received in step 158 (as represented in FIG. 7(*d*)), the processor 40 in step 160 compares the version indicator included in the Package Definition Packet 7(*d*) with the version indicator the processor 40 previously stored in the memory 50 the last time the mobile terminal operating software was downloaded. If, based on such comparison, the processor 40 determines that the versions are the same, the processor 40 proceeds to step 162 in which it is concluded that the mobile terminal 36 will operate on the existing mobile terminal operating software stored therein since there have been no changes to the operating software. In step 162, the mobile terminal 36 completes any other conventional boot-up procedures.

In the event the processor 40 determines in step 160 that the host computer 30 has a new version of the operating software based on a difference between the version indicators, the processor 40 continues to step 164 in which it stores in the memory 50 (FIG. 2) the contents of the package definition field 126. The processor 40 then proceeds to step 166 in which it transmits a file request packet 130 as represented in FIG. 7(*e*) in order to request that the first file named in the package definition file included in the package definition field 126 be transferred from the host computer 30 to the mobile terminal 36. Next, in step 168 the processor 40 determines if a corresponding file packet 134 containing the requested file is received back from the host computer 30 within a predetermined response period (e.g., five seconds). If not, the processor 40 proceeds to step 170 in which it retransmits the same file request previously transmitted in step 166. The processor 40 then returns to step 168 as shown.

If the file packet 134 is received by the processor 40 as determined in step 168 and as represented in FIG. 7(*f*), the processor 40 proceeds to step 172. In step 172 the processor 40 stores the file contained in the file field 136 in the mobile terminal memory 50 according to the appropriate mode (e.g., replace or fail safe) and in the location specified by the information previously obtained in the package definition field 126. Thereafter, the processor 40 proceeds to step 174 in which it determines if there are more files to be downloaded from the host computer 30. Specifically, the processor 40 determines whether there exists any more files in the list of file names provided in the package definition field 126 which have not yet been downloaded. If additional files exist, the processor 40 proceeds from step 174 back to step 166 in which the processor 40 transmits a file request packet 130 requesting that the next file in the list be downloaded (e.g., FIG. 7(*g*)). In the event the last file has already been transferred as determined in step 174, the downloading of the new version of the operating software is complete. Hence, the processor 40 proceeds from step 174 to step 162 mentioned above.

Regarding steps 154, 158 and 168 discussed above, it will be appreciated that the processor 40 preferably is programmed to retransmit a respective packet only a predetermined number of times (e.g., five), and to terminate the routine in the event a response still is not received. This avoids the mobile terminal becoming hung up due to a system failure. In such case, the processor 40 allows the mobile terminal 36 to continue to operate with the existing version of software stored therein.

Figure 9:
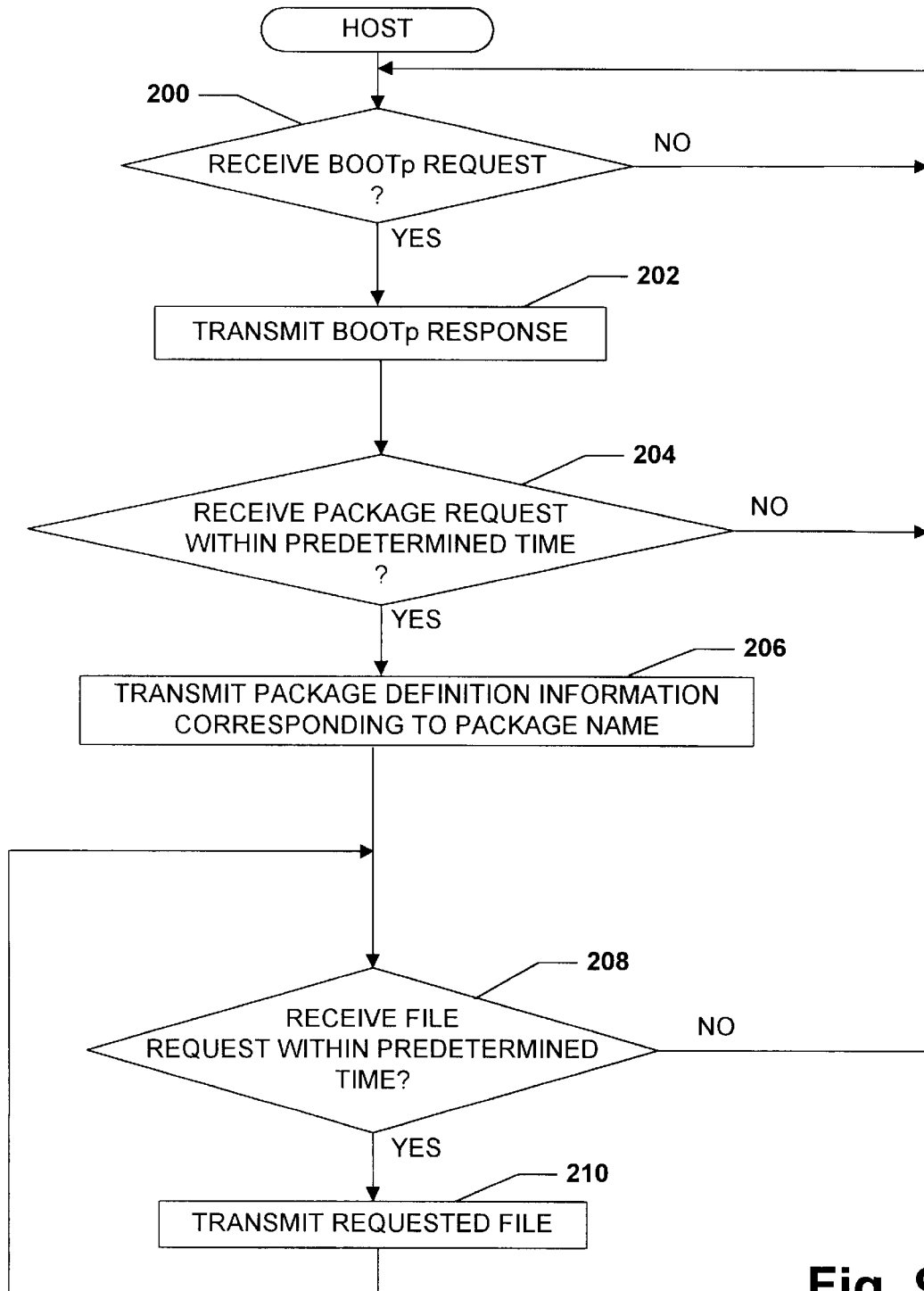
FIG. 9 is a system flowchart suitable setting up the host computer to respond to the mobile terminal seeking upgraded operating software in accordance with the present invention.

Referring briefly to FIG. 9, the operation of the host computer 30 is illustrated during the boot-up routine of the mobile terminal 36. Beginning in step 200, the host computer processor 64 determines if a Bootp Request Packet 100 has been received from a mobile terminal 36 as represented in FIG. 7(*a*). If not, the processor 64 continues to loop through step 200. If a Bootp Request Packet 100 is received, the processor 64 proceeds to step 202 in which the processor 64 transmits a Bootp Response Packet 110 in response as represented in FIG. 7(*b*). Next, in step 204 the processor 64 determines if the host computer 30 receives a Package Request Packet 118 within a predetermined period of time (e.g., five seconds). If not, the processor 64 returns to step 200. Otherwise, upon receiving the Package Request Packet 118 (as represented in FIG. 7(*c*)), the processor 64 proceeds from step 204 to step 206. In step 206 the processor 64 transmits back to the mobile terminal 36 the package definition packet 124 corresponding to the package name included in the Package Request Packet 118 as represented in FIG. 7(*d*).

Following step 206, the processor 64 determines in step 208 whether a file request packet 130 is subsequently received from the mobile terminal 36 within a predetermined period of time (e.g., five seconds). If not, the processor 64 returns to step 200. If a file request packet 130 is received as represented in FIG. 7(*e*), the processor 64 proceeds to step 210 in which the processor 64 transmits the requested file to the mobile terminal 36 in a file packet 134 (FIG. 7(*f*)). Following step 210, the processor 64 returns to step 208 to await a file request for another file. In this manner, the host computer 30 and a mobile terminal 36 requiring a new version of operating software will exchange file request packets 130 and file packets 134 until all of the files have been downloaded to the mobile terminal 36.

Those having ordinary skill in the art will appreciate that steps 200 and 202 in FIG. 9 can be carried out by a Bootp server (not shown) included in the host computer 30. Steps 204–210 may be carried out separately by an FTP server (not shown) which also is included in the host computer 30.

Figure 10:
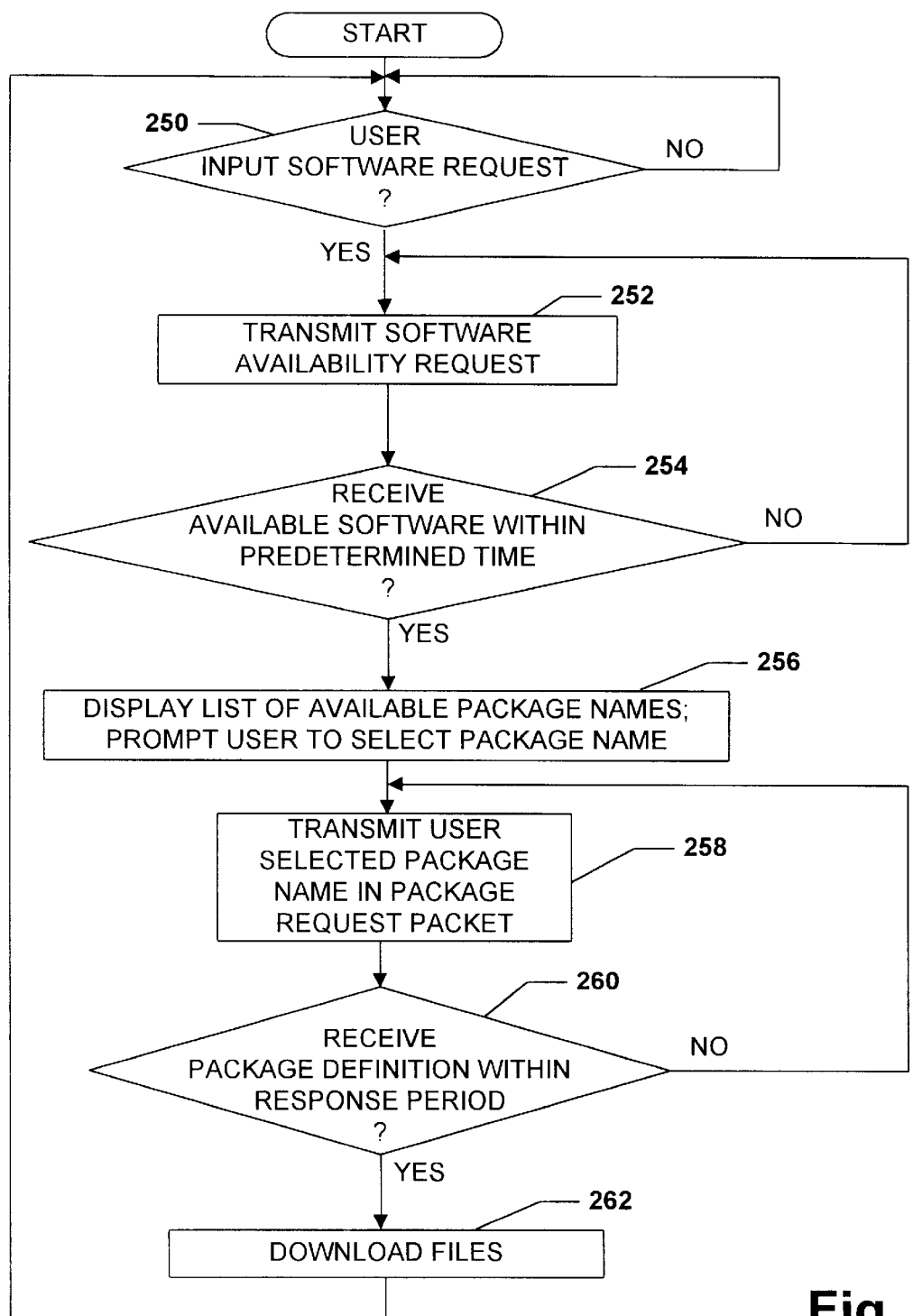
FIG. 10 is a system flowchart suitable for programming the mobile terminal and setting up the host computer to enable a user to select from among different packages of operating software available from the host computer in accordance with the present invention.

Referring now to FIG. 10, an aspect of the invention whereby a mobile terminal user may selectively download operating software from the host computer 30 will be explained. Such aspect allows the mobile terminal user to input via the user input device 42 (FIG. 2) a selection of available packages of software which may be downloaded from the host computer 30. The available software packages are displayed on the display 46, and the user presses a key on the input device 42 corresponding to the desired package. The mobile terminal 36 and the host computer 30 are programmed to exchange the appropriate files and file information automatically as described below.

More specifically, beginning in step 250 the processor 40 of the mobile terminal 36 is programmed to determine if the user inputs a request for available software. Such a request can be a predefined selection of one or more keys on the user input device 42. Until such time as the user inputs such a request, the processor 64 continues to loop through step 250.

Upon receiving such a request as determined in step 250, the processor 40 proceeds to step 252 in which the processor 40 transmits a request packet to the host computer 30 requesting that the host computer 30 transmit a list of the package names corresponding to the package definition files stored in the memory 66. In response to the request packet the host computer processor 64 is programmed to generate a list of the package names (e.g., Package A, Package B, etc.) and transmit the list to the mobile terminal 36.

Following step 252, the processor 40 determines in step 254 whether the list of package names has been received from the host computer 30 within a predetermined time (e.g., five seconds). If not, the processor 40 returns to step 252 and retransmits the request packet. Otherwise, upon receiving the list of package names as determined in step 254, the processor 40 proceeds to step 256 in which it displays on the display 46 the list of package names received from the host computer 30. In addition, the processor 40 prompts the user via the display 46 to select the desired package name. Such selection may be made by the user by pressing keys on the input device 42 identified on the display as corresponding to the respective possible selections, for example, or alternatively cursor keys and other input techniques could also be used.

Upon receiving the user selection in step 256, the processor 40 proceeds to step 258 in which the processor 40 forms and transmits to the host computer 30 a package request packet 118 of the same format represented in FIG. 7(c). Included in the package name field 121 is the package name selected by the user in step 256. The host computer processor 64 is set up to receive the package request packet 118 and transmit in response a package definition packet 124 of the same format represented in FIG. 7(d). In step 260, the mobile terminal processor 40 determines whether a package definition packet 124 has been received within a predetermined response period (e.g., five seconds). If not, the processor 40 returns to step 258 in which the package request packet 118 is retransmitted to the host computer 30.

On the other hand, if the package definition packet 124 is received as determined in step 260, the processor 40 proceeds to step 262 in which it downloads the files corresponding to the selected package name. Specifically, in step 262 the mobile terminal 36 and the host computer 30 exchange file request packets 130 and file packets 134 in the same manner as is described above in relation to FIGS. 8(a)–8(b) and 9. More specifically, step 262 in FIG. 10 embodies, for example, the same steps 166–174 in FIG. 8(b) and steps 208–210 in FIG. 9. As a result, the files corresponding to the package name selected by the user are downloaded to the mobile terminal 36. Thus, the present invention provides considerable user flexibility in determining software to be downloaded.

Figure 11:
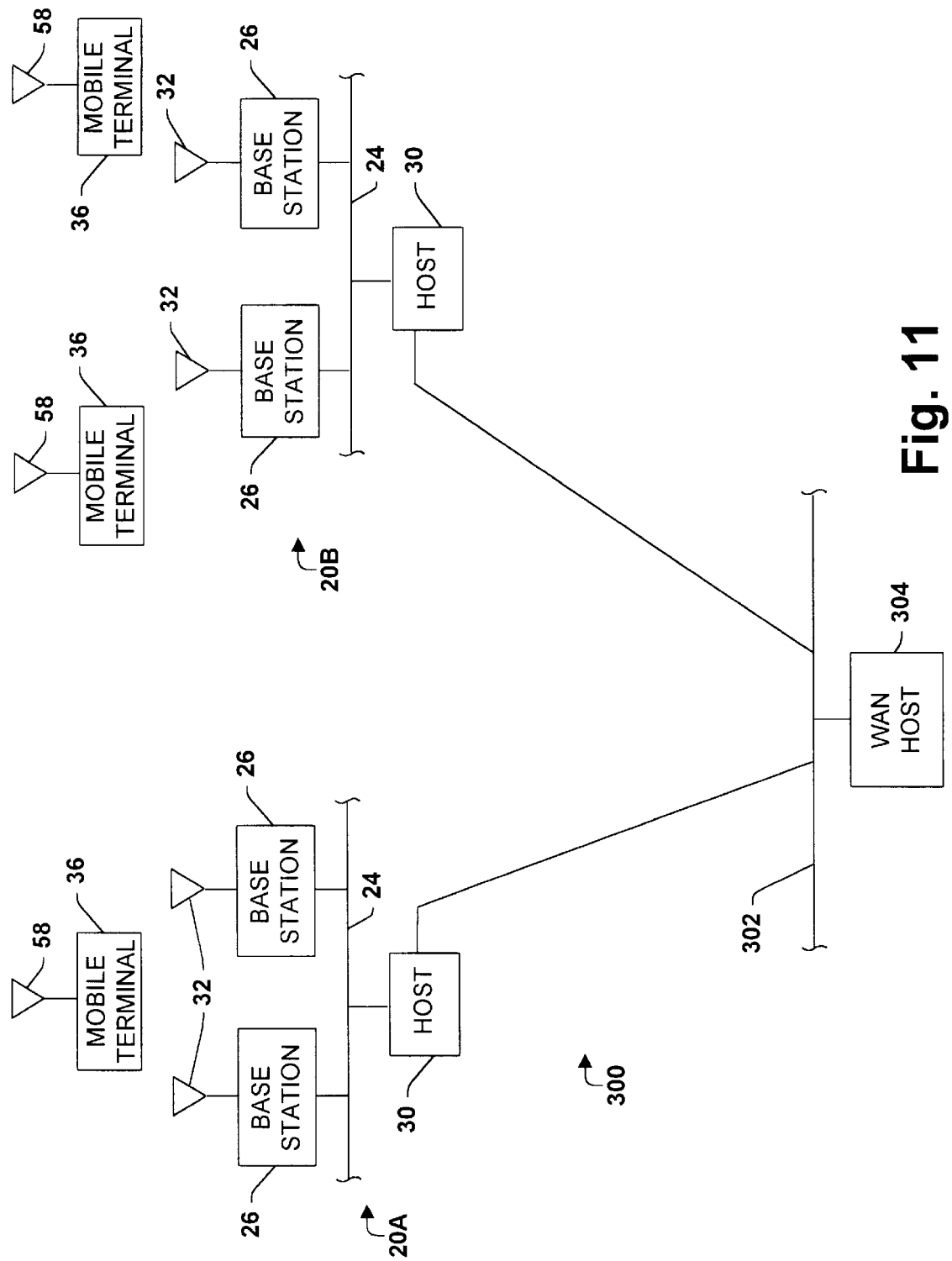
FIG. 11 is a block diagram of a WAN based system in accordance with the present invention.

Referring now to FIG. 11, a wide area network (WAN) 300 is shown in accordance with another aspect of the invention. The WAN 300 in the exemplary embodiment includes a plurality of local area network (LAN) communication systems 20 of the type shown in FIG. 1, the respective systems being identified as 20A and 20B in FIG. 11. The WAN 300 includes a WAN based system backbone 302 to which the host computer 30 in each of the systems 20A and 20B is connected. The system backbone 302 may be any conventional internet connection, whether hardwired and/or wireless. Also connected to the system backbone 302 is a WAN host computer 304 for carrying out host computer activities on the WAN 300.

By virtue of the WAN host computer 304 being linked to the host computers 30 in each of the systems 20A and 20B, it is possible to perform global software upgrades. Specifically, the WAN host computer 304 can broadcast to each host computer 30, via the system backbone 302, an updated Package Definition table (FIG. 5) together with the updated mobile terminal operating software relating to the Package Definition table. The host computer 30 in each system 20A and 20B replaces the previous Package Definition table previously stored in its memory with the new table and files. Thus, the next time the mobile terminals 36 in the respective systems 20A and 20B boots up or otherwise attempts to download a new version of operating software, such software will be available in the host computer 30. Consequently, entire networks can be updated quickly and uniformly.

Although the invention has been shown and described with respect to certain preferred embodiments, it is obvious that equivalents and modifications will occur to others skilled in the art upon the reading and understanding of the specification. For example, the present invention has been described with respect to the mobile terminal 36 comparing the version of operating software it currently has stored within its memory with the version of software stored in the host computer 30; and if the mobile terminal 36 has a different version of operating software stored within, it issues a request to the host computer 30 to transmit to the mobile terminal 36 an upgraded version of the operating software. However, it will be appreciated that the host computer 30 can make the comparison of the operating software within to that stored in the mobile terminal 36 based on version information provided by the mobile terminal 36 to the host computer 30 in the Bootp Request packet, for example. If the host computer 30 determines the mobile terminal 36 has a different version of operating software than the host computer 30, the host computer 30 can make the determination to upgrade the operating software of the mobile terminal 36 and transmit to the mobile terminal 36 an upgraded version of the software.

Furthermore, the file transfer protocol utilized in the present invention for transferring files between the mobile terminal and the host computer is not limited to any particular file transfer protocol. Any of a variety of known protocols such as TASP, FTP and TFTP can be used without departing from the scope of the invention.

The present invention includes all such equivalents and modifications, and is limited only by the scope of the following claims.

What is claimed is:

1. A wireless communication system, comprising:

a system backbone;

a host computer coupled to the system backbone, the host computer having a host computer memory with mobile device operating software stored therein;

at least one base station coupled to the system backbone and including a base station transceiver for conducting wireless communications, the at least one base station enabling communications between the host computer and mobile devices within the system by serving as an interface between wireless communications involving the mobile devices and hardwired communications involving the host computer via the system backbone; and at least one mobile device for conducting communications with the host computer by way of the at least one base station and the respective base station transceiver, the at least one mobile device including:

a mobile device transceiver for communicating wirelessly with the base station transceiver;

a programmable control circuit controlling the operation of the mobile device;

a mobile device memory for storing mobile device operating software executed by the programmable control circuit; and wherein the programmable control circuit is operatively coupled to the mobile device transceiver to send at least one communication to the host computer which prompts the host computer to communicate to the mobile device indicia representing a version of mobile device operating software stored in the host computer memory, whereby the programmable control circuit compares the indicia to a version of mobile device operating software currently stored in the mobile device memory, and based on the comparison the mobile device selectively sends at least one other communication to the host computer which prompts the host computer to communicate to the mobile device at least a portion of the mobile device operating software stored in the host computer memory.

2. The system of claim 1, wherein the mobile device prompts the host computer to communicate the indicia as part of a boot-up routine of the mobile device.

3. The system of claim 1, wherein in the event the version of mobile device operating software stored in the mobile device memory is different from the version of mobile device operating software stored in the host computer memory, the host computer communicates the mobile device operating software stored therein to the mobile device via the at least one base station.

4. The system of claim 3, wherein the mobile device replaces the mobile device operating software presently stored in the mobile device memory with the mobile device operating software provided from the host computer.

5. A wireless communication system, comprising a system backbone;

a host computer coupled to the system backbone;

at least one base station coupled to the system backbone, the at least one base station including a base station transceiver for communicating wirelessly with mobile devices within the system;

at least one mobile device having a mobile device transceiver for communicating wirelessly with the host computer on the system backbone via the at least one base station, and a user input for receiving a user selection; and wherein the host computer and the at least one mobile device are operatively configured to communicate selectively mobile device operating software therebetween based on the user selection, the mobile device is configured to communicate a request to the host computer requesting that the host computer provide a list of available mobile device operating software, and the mobile device displays the list in order to allow the user to input the user selection.

6. The wireless communication system of claim 5, wherein the mobile device is configured to communicate a request for particular mobile device operating software to the host computer based on the user selection.

* * * * *